2,937,191

Patented May 17, 1960

2,937,191
PROCESS FOR THE PRODUCTION OF Δ⁹⁽¹¹⁾ STEROIDS

Franz Sondheimer, Octavio Mancera, and George Rosenkranz, Mexico City, Mexico, assignors to Syntex S.A., Mexico City, Mexico, a corporation of Mexico No Drawing. Application December 17, 1954
Serial No. 476,072

Claims priority, application Mexico December 18, 1953

3 Claims. (Cl. 260—397.3)

The present invention is directed to cyclopentanophenanthrene compounds and to a process for the production thereof.

More particularly the present invention relates to the production of $\Delta^{9(11)}$-steroids by dehydration of the corresponding 11-hydroxycompounds.

Steroidal 11β-hydroxy compounds are easily dehydrated to the corresponding $\Delta^{9(11)}$ compounds. For example, Shoppee and Reichstein, Helv. Chim. Acta 24, 351 (1941), discloses the dehydration of 11β-hydroxyprogesterone in the presence of hydrochloric acid to give an active progestational hormone $\Delta^{4,9(11)}$-pregnadiene-3,20-dione (9-dehydroprogesterone). In general, however, the 11α-hydroxy compounds were considered to be difficult to dehydrate.

In accordance with the present invention, a novel method has been discovered for the dehydration of 11α-hydroxy steroidal compounds. There has further been discovered in accordance with the present invention a method for the direct dehydration of 11α-hydroxy steroids, particularly where these steroids do not contain α,β-unsaturated keto groupings, involving the reaction of these steroids with phosphorous oxychloride in pyridine. Further, there has been discovered a method for the dehydration of 11α-hydroxy steroids involving the formation of the 11-tosylate followed by heating of the tosylate in the presence of a tertiary amine such as collidine. In addition, there has been discovered in accordance with the present invention a novel $\Delta^{9(11)}$-steroid which is a useful intermediate for the production of the progestational hormone 9-dehydroprogesterone.

A portion of the process of the present invention may be illustrated by the following equations:

In the above equation A represents CH . . . OH or CH—OH and the above equations illustrates the action of a dehydrating agent on typical 11α-hydroxy steroids, i.e., a steroid of the spirostane series and a steroid of the pregnane series. The above equations further illustrate the action of phosphorous oxychloride and pyridine on certain 11β-hydroxy steroids as well. In the above equation it will be noted that the 3-hydroxy group is protected as by the formation of an ester, R representing the residue of any acid ordinarily used for the esterification of steroid alcohols. In general, these acids may be classified as carboxylic acids of less than about 10 carbon atoms and especially hydrocarbon carboxylic acids, including aromatic acids such as benzoic and simple aliphatic acids such as benzoic and simple aliphatic acids such as acetic, propionic, and butyric acids. It will be noted further that the above steroids do not contain an α,β-unsaturated keto group.

In practicing the process above outlined, the 11-hydroxy steroid, such as for example the 3-monoacetate of 22a,5α-spirostane-3β,11α-diol, or the 3-monoacetate of 22a,5α-spirostane-3β,11β-diol or pregnane-11α-ol-3,20-dione or pregnane-11β-ol-3,20-dione is dissolved in pyridine and preferably cooled. Phosphorous oxychloride is then added and the mixture kept at room temperature for a substantial period of time, i.e., 12 to 20 hrs. The excess of reagent is then carefully decomposed by the addition of ice and the product extracted and purified. The products produced from the 11α-hydroxy and from the 11β-hydroxy compounds were identical, namely, the corresponding $\Delta^{9(11)}$ compounds. These derivatives are valuable intermediates for the production of the known progestational hormone 9-dehydroprogesterone. Thus $\Delta^{9(11)}$-pregnene-3,20-dione may readily be transformed into 9-dehydroprogesterone by monobromination to form the corresponding 4-bromo derivative followed by conventional dehydrobromination. In the case of the sapogenin $\Delta^{9(11)}$ compound produced, conventional oxidative degradation produces the corresponding $\Delta^{9(11),16}$-allopregnadiene derivative, which upon selective hydrogenation gives the corresponding $\Delta^{9(11)}$-allopregnane compound. Oppenauer oxidation of the 3-hydroxy group gives the corresponding 3-ketone which may be subjected to the known method for the introduction of the 4-5 double bond into compounds of the allo series set forth in U.S. application Serial No. 140,152, filed January 23, 1950, now Patent No. 2,715,637.

In the instances where the 11α-hydroxy steroids to be converted into $\Delta^{9(11)}$ compounds contain an α,β-unsaturated keto group as the $\Delta^4$-3-keto group or other groups effected by the degradating agents previously referred to, dehydration is advantageously produced in accordance with the following equations which as indicated illustrate a process also applicable to the dehydration of saturated compounds:

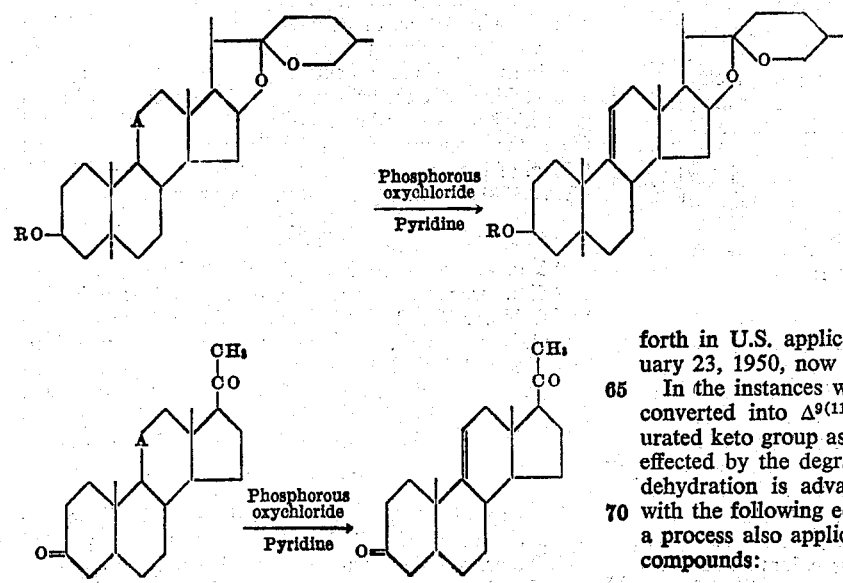

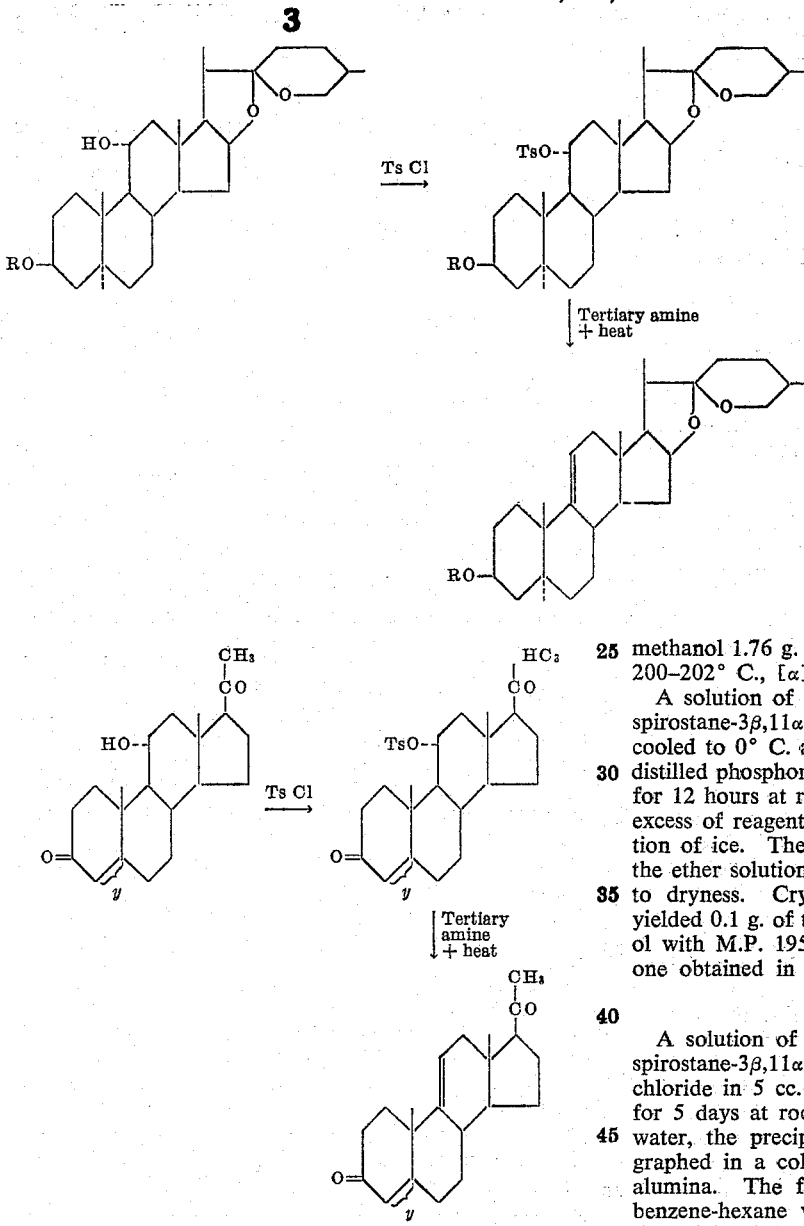

In the above equations R has the same meaning as heretofore and Ts represents, as is well known, the tosyl (p-toluene-sulphonyl) radical. Y represents either a double bond or saturated linkage between C–4 and C–5.

In practicing the process above outlined, the 11-hydroxy steroid together with p-toluenesulphonyl chloride is dissolved in pyridine and maintained at room temperature for varying periods of time sufficient to form the p-toluenesulphonate. After at least partial purification the p-toluenesulphonate is then refluxed with a tertiary amine such as collidine to form the corresponding $\Delta^{9(11)}$ compound.

The following examples serve to illustrate but are not intended to limit the present invention:

Example I

A solution of 5 g. of 22a,5α-spirostane-3β,11α-diol, prepared in accordance with U.S. patent application Serial No. 291,556, filed June 3, 1952, in 125 cc. of acetic acid containing 2.5 cc. of concentrated hydrochloric acid was kept standing for 18 hours at room temperature. Addition of water and filtration afforded a solid product which purified by chromatography in a column with 200 g. of ethyl acetate washed alumina. The first fractions eluted from the column with benzene-hexane gave 1.6 g. of the diacetate; the fractions eluted from the column with benzene-ether afforded after crystallization from chloroform-methanol 1.76 g. of the desired 3-monoacetate with M.P. 200–202° C., $[\alpha]_D$ —76° (chloroform).

A solution of 0.2 g. of the 3-monoacetate of 22a,5α-spirostane-3β,11α-diol in 2 cc. of anhydrous pyridine was cooled to 0° C. and then mixed with 0.6 cc. of recently distilled phosphorous oxychloride. The mixture was kept for 12 hours at room temperature, cooled in ice and the excess of reagent was decomposed by the cautious addition of ice. The product was extracted with ether, and the ether solution was washed to neutral and evaporated to dryness. Crystallization from chloroform-methanol yielded 0.1 g. of the acetate of $\Delta^{9(11)}$-22a,5α-spirosten-3β-ol with M.P. 195–197° C. $[\alpha]_D$ —51°, identical to the one obtained in accordance with Example II.

Example II

A solution of 0.5 g. of the monoacetate of 22a,5α-spirostane-3β,11α-diol and 0.5 g. of p-toluenesulphonyl chloride in 5 cc. of anhydrous pyridine was maintained for 5 days at room temperature. After the addition of water, the precipitate was filtered and then chromatographed in a column of 30 g. of ethyl acetate washed alumina. The fractions eluted from the column with benzene-hexane were crystallized from acetone-hexane, thus giving 0.41 g. of the p-toluenesulphonate with M.P. 126–128° C., $[\alpha]_D$ —49° (chloroform).

0.4 g. of this p-toluenesulphonate was refluxed for 30 minutes with 10 cc. of collidine, cooled and poured into water. The product was extracted with ether. The ether solution was washed to neutral and evaporated to dryness. The residue was chromatographed in a column with 30 g. of ethyl acetate washed alumina and the fractions eluted from the column with chloroform-methanol afforded 0.21 g. of the acetate of $\Delta^{9(11)}$-22a,5α-spirosten-3β-ol with M.P. 197–199° C., $[\alpha]_D$ —50° (chloroform).

Example III 0.2 g. of the 3-monoacetate of 22a,5α-spirostane-3β-11β-diol, prepared in accordance with U.S. application Serial No. 306,512, filed August 26, 1952, now abandoned, was treated in exactly the same way as described in Example I for the 3β,11α-isomer. There was obtained 0.12 g. of the $\Delta^{9(11)}$-compound with M. P. 198–199° C., $[\alpha]_D$ —48° (chloroform), identical to the substances obtained in accordance with the two previous examples.

Example IV 300 mg. of the known pregnan-11α-ol-3,20-dione dissolved in 2 cc. of anhydrous pyridine was dehydrated with 0.8 cc. of phosphorous oxychloride at room temperature for 20 hours, in accordance with the method described in Example I. Extraction and purification with ether followed by chromatography in a column with 15 g. of ethyl acetate washed alumina yielded 100 mg. of $\Delta^{9(11)}$-pregnene-3,20-dione with M.P. 146°–149° C.

Example V 0.5 g. of p-toluenesulphonyl chloride was added to a solution of 0.5 g. of pregnan-11α-ol-3,20-dione in 3.5 cc. of anhydrous pyridine and the mixture was kept at room temperature for 3 hrs. Addition of water, extraction with ether and crystallization from acetone-hexane afforded 0.37 g. of the p-toluenesulphonate with M.P. 159–160° C., $[\alpha]_D$ +74° (chloroform).

200 mg. of this p-toluenesulphonate was refluxed for 30 minutes with 2 cc. of collidine and the solution was cooled and poured into water. The product was extracted with ether, the ether solution was washed to neutral, dried over sodium sulphate and evaporated to dryness. The residue was chromatographed in a column with 10 g. of ethyl acetate washed alumina and the fractions eluted from the column with hexane-benzene were crystallized from acetone-hexane, thus giving 72 mg. of $\Delta^{9(11)}$-pregnene-3,20-dione with M.P. 147–149° C., $[\alpha]_D$ +58° (chloroform) identical to the one obtained in accordance with Example IV.

Example VI 200 mg. of pregnan-11β-ol-3,20-dione, prepared in accordance with U.S. application Serial No. 314,752, filed October 14, 1952, now abandoned, in 1.5 cc. of anhydrous pyridine was dehydrated with 0.6 cc. of phosphorous oxychloride in accordance with the method described in Example I. There was obtained 80 mg. of $\Delta^{9(11)}$-pregnene-3,20-dione with M.P. 148–150° C., $[\alpha]_D$ +61° (chloroform), identical to the one obtained in accordance with Examples IV and V.

Example VII

A solution of 1 g. of the known 11α-hydroxy-progesterone and 1 g. of p-toluenesulphonyl chloride in 10 cc. of anhydrous pyridine was kept for 3 days at room temperature and then poured into water. The product was extracted with chloroform and chromatographed in a column with 50 g. of ethyl acetate washed alumina. The fractions eluted from the column with benzene were crystallized from acetone-hexane, thus yielding 1.1 g. of the p-toluenesulphonate with M.P. 154–155° C., $[\alpha]_D$ +132° (chloroform).

0.5 g. of the p-toluenesulphonate of 11α-hydroxyprogesterone was dissolved in 10 cc. of collidine and the solution was refluxed for 30 minutes, cooled and diluted with water. Extraction with ether afforded 0.33 g. of a solid product which was chromatographed in a column with 20 g. of ethyl acetate washed alumina. The fractions eluted with hexane-benzene and with benzene were crystallized from acetone-hexane, thus giving 0.24 g. of $\Delta^{9(11)}$-dehydroprogesterone with M.P. 127–128° C., $[\alpha]_D$ +171° (chloroform).

We claim:
1. A process for the preparation of $\Delta^{9(11)}$-compounds of the pregnane series comprising refluxing the corresponding 11α-p-toluenesulphonate with collidine.
2. A process for the preparation of $\Delta^{9(11)}$-pregnene-3,20-dione comprising refluxing the p-toluenesulphonate of pregnan-11α-ol-3,20-dione with collidine.
3. A process for the preparation of $\Delta^{4,9(11)}$-pregnadiene-3,20-dione comprising refluxing the p-toluenesulphonate of $\Delta^4$-pregnen-11α-ol-3,20-dione with collidine.

References Cited in the file of this patent

UNITED STATES PATENTS

| | | |
|---|---|---|
| 2,409,798 | Reichstein | Oct. 22, 1946 |
| 2,479,966 | Reichstein | Aug. 23, 1949 |
| 2,554,882 | Reichstein | May 29, 1951 |
| 2,728,783 | Graber | Dec. 27, 1955 |
| 2,752,369 | Holysz et al. | June 26, 1956 |
| 2,763,671 | Fried et al. | Sept. 18, 1956 |

OTHER REFERENCES

Fried, J. Am. Chem. Soc., May 3, 1953, vol. 75, pages 2273–74.